United States Patent

[11] 3,550,736

| [72] | Inventor | Ernest U. Lang<br>Niles, Mich. |
|---|---|---|
| [21] | Appl. No. | 768,702 |
| [22] | Filed | Oct. 18, 1968 |
| [45] | Patented | Dec. 29, 1970 |
| [73] | Assignee | National-Standard Company<br>Niles, Mich.<br>a corporation of Delaware |

[54] BAND CLUTCH CONSTRUCTION
7 Claims, 8 Drawing Figs.

[52] U.S. Cl. ..................................................... 192/41,
  192/81
[51] Int. Cl. ..................................................F16d 41/20,
  F16d 13/08
[50] Field of Search ............................................ 192/41, (S),
  56(C), 80, 81

[56]  References Cited
UNITED STATES PATENTS

| 613,766 | 11/1898 | Hodgkinson ................. | 192/41(S) |
| 2,425,731 | 8/1947 | Dodwell ........................ | 192/41(S) |
| 3,000,471 | 9/1961 | Glenn ............................ | 192/41(S)(X) |
| 3,412,833 | 11/1968 | Lang ............................. | 192/41(S) |

FOREIGN PATENTS

| 862,234 | 1/1953 | Germany ...................... | 192/41(S) |

Primary Examiner—Allan D. Herrmann
Attorney—Johnson, Dienner, Emrich, Verbeck & Wayner ABSTRACT: Clutch bands for use in overrunning clutches having drive and driven members, each clutch band being provided with anchoring means for pivotally anchoring the clutch band at its wider end portion to one of the clutch members for pivotal movement of the wider end portion of the clutch band on an axis transverse to the wider end portion of the clutch band and parallel to the common axis of the clutch members so as to distribute tension on the clutch band over the entire width of the wider end portion of the clutch band.

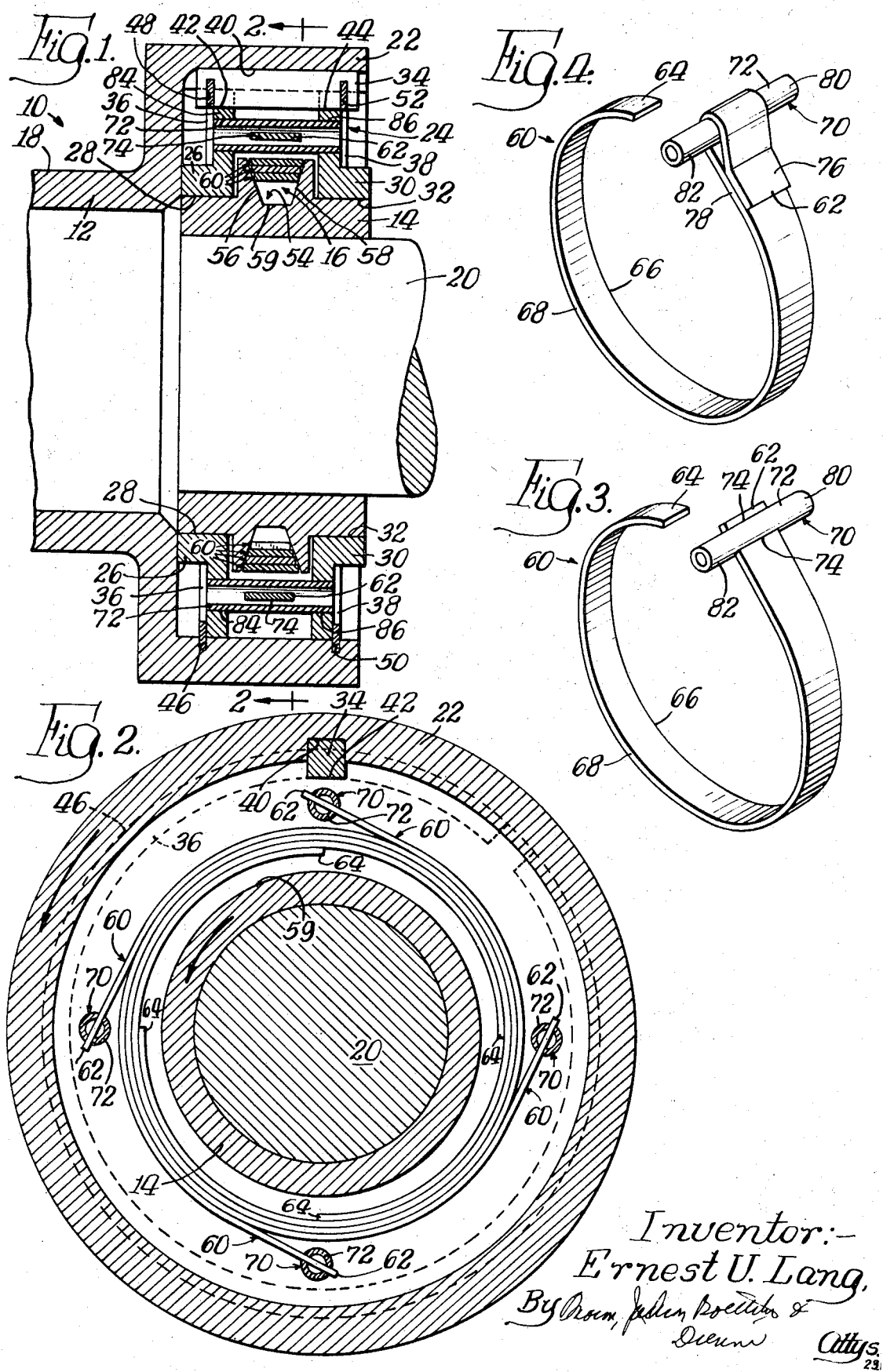

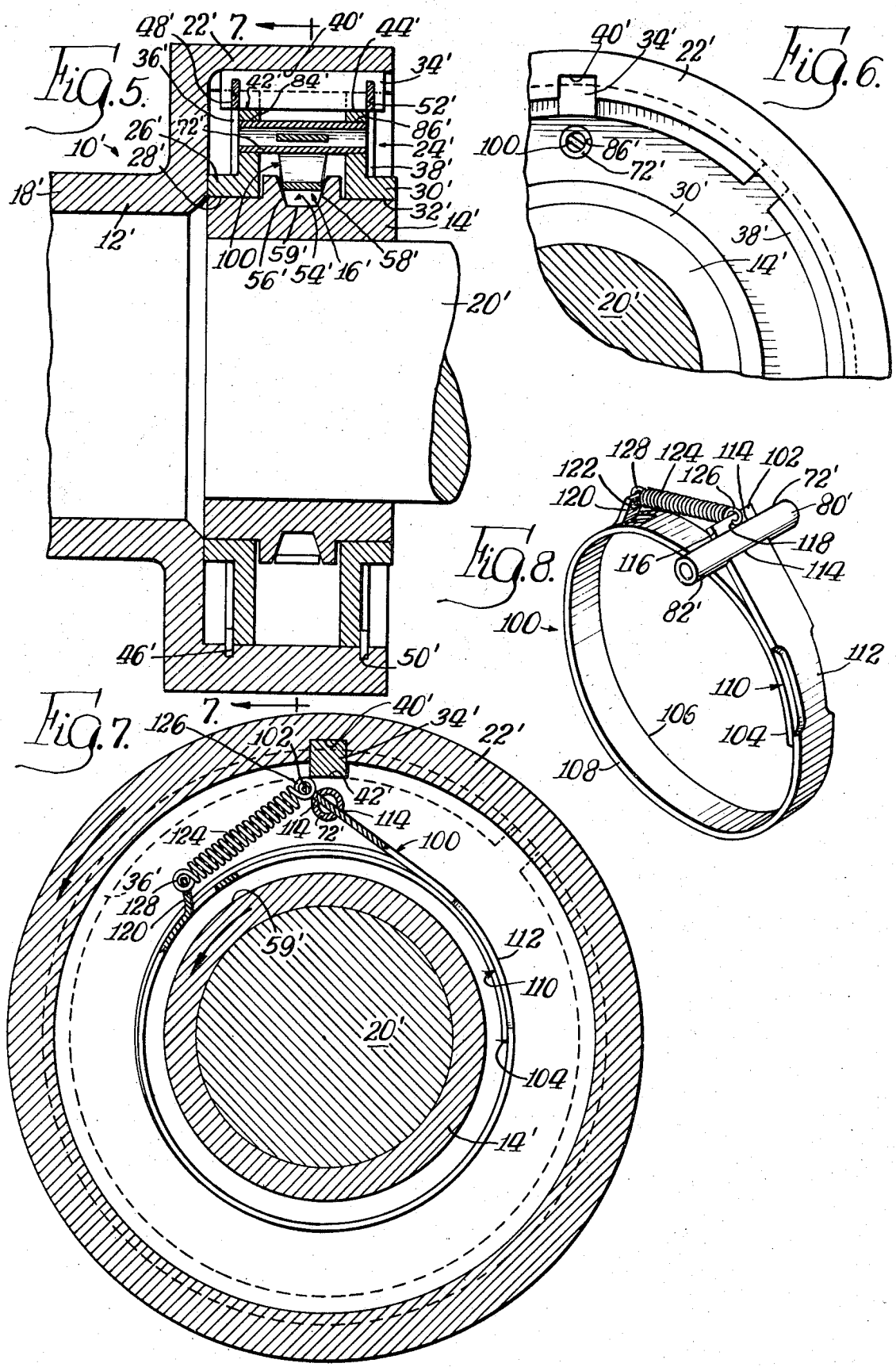

BAND CLUTCH CONSTRUCTION

The present invention relates to clutch bands for band clutches of the overrunning type.

The clutch bands of this invention have particular utility for the class of band clutch constructions typically shown in U.S Pat. No. 2,518,453, issued Aug. 15, 1950 to John M. Dodwell. This patent discloses a band-type freewheeling clutch embodying drive and driven clutch members, one of which is provided with a V-groove into which the narrow tapered ends of a plurality of interfitting and overlapping clutch bands are disposed. The wide ends of such clutch bands are fixed to the other of such clutch members. The arrangement is such that upon rotation of the drive member in one direction a driven member is driven in the same direction through engagement of the side edges of the narrow tapered ends of the clutch bands with the side walls of the V-groove. Furthermore when the driven member rotates at a faster speed than the drive member, the clutch bands permit the driven member to overrun the drive member.

In certain later forms of band clutches of the above type, single clutch bands are employed.

Early in the development of clutches of the above type, a major problem resided in providing adequate anchors for the fixed ends of the clutch bands. Various structural arrangements whereby the fixed end of a clutch band might be made fast to one of the clutch members have proved to be unsatisfactory because many of these structures soon fail by fracturing of the metal of the clutch band adjacent the fixed end.

Such failures usually are attributed either to concentrated stress loads or to fatigue. Concentrated stress loads occur in a clutch in which the clutch bands are anchored to the appropriate clutch member by means of pins, rivets, or the like passing through openings or slots in the clutch bands adjacent their fixed ends. During operation of such a clutch, heavy stresses are concentrated at the edges of the openings or slots, and failure usually first occurs at such points of stress concentration. Fatigue occurs in a clutch in which the fixed ends of the clutch bands are rigidly anchored to the appropriate clutch member such that flexure of the clutch bands adjacent their fixed ends occurs in each clutching cycle. During operation of such a clutch for numerous clutching cycles, failure usually first occurs at the points of repeated flexure.

This invention is addressed to a novel solution to the problem of anchoring clutch bands of band clutches of the aforementioned type so as to eliminate failures due to concentrated stress loads or to fatigue.

It is one object of this invention to provide, in such a band clutch, clutch bands anchored in such a way so as to be free of points of stress concentration.

It is a related object of this invention to provide, in such a band clutch, clutch bands anchored in such a way as to avoid flexure of the clutch bands during operation of the clutch.

The above objects are attained by using anchoring means for pivotally anchoring the clutch bands for pivotal movement on axes transverse to the wider end portions of the clutch bands and parallel to the axis common to the clutch members during operation of the clutch.

Such anchoring means comprises an anchor member connected to the wider end portion of each clutch band and to the appropriate clutch member so as to permit the desired pivotal movement of the wider end portions of the clutch bands. Also, the anchor members are connected to the wider end portions of the clutch bands so as to distribute tension on the clutch bands over the entire width of the wider end portions of the clutch bands.

Preferably, each anchor member is in the form of an elongated cylindrical pin suitably connected to the wider end portion of one of the clutch bands and to the appropriate clutch member.

With anchor means as described, it is possible to construct a highly efficient band clutch of the aforementioned type having a single clutch band, and the provision of a clutch band for such a band clutch is another object of this invention.

These and other objects, features and advantages of this invention will be evident from the following description with the aid of the attached drawings of two preferred embodiments of this invention.

In the drawings:

FIG. 1 is a vertical sectional view of a clutch employing a plurality of clutch bands of the present invention;

FIG. 2 is a detail sectional view taken substantially on the line 2–2 of FIG. 1 looking in the direction of the arrows;

FIG. 3 is a perspective view of a clutch band of the present invention as shown in FIGS. 1 and 2;

FIG. 4 is a perspective view of a clutch band of the present invention of a modified form for use in the clutch of FIGS. 1 and 2;

FIG. 5 is a vertical sectional view of a clutch employing a single clutch band of the present invention;

FIG. 6 is a fragmentary end elevational view taken from the right side of FIG. 5;

FIG. 7 is a detail sectional view taken substantially on line 7–7 of FIG. 5 looking in the direction of the arrows; and FIG. 8 is a perspective view of a clutch band of the present invention as shown in FIGS. 5—7.

In FIGS. 1 and 2, there is shown an overrunning band clutch 10 which has known drive and driven clutch members 12 and 14, respectively, and with which clutch band means of the present invention, indicated generally at 16, has been incorporated.

In the clutch 10, the drive clutch member 12 is in the form of a drive shaft 18 adapted to be driven by a suitable prime mover (not shown), and the driven clutch member 14 is made fast to a driven shaft 20. The drive clutch member 12 has an annular flange 22 at the outer end thereof. The driven clutch member 14 is arranged coaxially within the annular flange 22 in piloting relation to the drive clutch member 12. Thus, in the arrangement of the parts as shown, when the driven clutch member 14 is rotating in the same direction as the drive clutch member 12 but at a faster speed, the driven clutch member 14 overruns the drive clutch member 12.

The drive clutch member 12 comprises an anchor supporting structure, indicated generally at 24, disposed within the annular flange 22 and around the driven clutch member 14 and keyed to the annular flange 22 for rotation therewith. The anchor supporting structure 24 comprises an inner anchor supporting flange member 26, on the inside of the driven clutch member 14, closely fitting the annular flange 22 and having an enlarged circular axial opening 28 through which portions of the driven clutch member 14 extend for free rotation with respect thereto, an outer anchor supporting flange member 30, similar to the inner anchor supporting flange 26, on the outside of the driven clutch member 14, closely fitting the annular flange 22 and having an enlarged circular axial opening 32 through which portions of the driven clutch member 14 extend for free rotation with respect thereto, an elongated key 34, generally square in cross section, keying the flange members 26 and 30 to the annular flange 22 for conjoint rotation therewith, and opposed inner and outer split retailing rings 36 and 38, respectively, retaining the key 34 and the flange members 26 and 30 in place with respect to the annular flange 22. The key 34 fits within a transverse keyway 40 in the annular flange 22 and within keyways 42 and 44 in the respective flange members 26 and 30. The inner split retaining ring 36 is flush with the flange member 26, as shown in FIG. 1, and fits within a peripheral slot 46 in the annular flange 22 and within a cross slot 48 in the key 34. The outer split retaining ring 38 similarly is flush with the flange member 30, as shown in FIG. 1, and fits within a peripheral slot 50 in the annular flange 22 and within a cross slot 52 in the key 34.

As is known in clutches of this type, the driven clutch member 14 is formed with a circumferentially extending V-groove 54 defined by opposed sidewalls 56 and 58 tapering inwardly toward each other and by a bottom wall 59.

The aforementioned clutch band means 16, in the present embodiment, comprises four identical clutch bands 60 of generally spiral configuration, in a known interfitting and overlapping arrangement. Preferably each clutch band 60 is made of spring steel stock.

In the present embodiment, the clutch bands 60 are circumferentially disposed in spaced relation with respect to the clutch members 12 and 14, as is evident from FIG. 2.

As is best shown in FIG. 3, each clutch band has a wider end portion 62 and a narrower end portion or tip 64 and is tapered therebetween. Each clutch band 60 is directed into the V-groove 54 with its side edges 66 and 68, respectively, engaging the sidewalls 56 and 58 of the V-groove 54. The side edges 66 and 68 of the clutch bands 60 may be coined and beveled, as is known. Such portions of the clutch bands 60 as do not engage the sidewalls 56 and 58 of the V-groove 54 may be of any width and need not be tapered, and such portions of the clutch bands 60 as do engage the sidewalls 56 and 58 of the V-groove 54 need not be tapered overall, as will be understood. Each clutch band is anchored, in a manner to be described hereinafter, to the anchor supporting structure 24.

In operation of the clutch 10, upon rotation of the drive clutch member 12 in the direction of the arrow applied thereto in FIG. 2, tightening of the clutch bands 60 around the V-groove 54 is effected such that the side edges 66 and 68 of the clutch bands 60 are urged into frictional driving engagement with the sidewalls 56 and 58 of the V-groove 54. Thus, the driven clutch member 14 is rotated in the same direction, as is indicated by the arrow applied thereto in FIG. 2. However, when the driven clutch member 14 overruns the drive clutch member 12, the side edges 66 and 68 of the clutch bands 60 are disengaged from the sidewalls 56 and 58 of the V-groove 54.

The clutch bands 60 are provided with anchoring means for pivotally anchoring the clutch bands 60 at their wider end portions 62 for pivotal movement of axes transverse to the clutch bands and parallel to the axis common to the clutch members 12 and 14 during operation of the clutch 10. As shown, such anchor means comprises an anchor member 70 connected to the wider end portion 62 of each clutch band 60. The anchor members 70 are suitably connected to the anchor supporting flange members 26 and 30, and through the key 34 and the split retaining rings 36 and 38 to the annular flange 22, so as to permit the desired pivotal movement of the wider end portions 62 of the clutch bands 60. Also, the anchor members 70 are connected to the wider end portions 62 of the clutch bands 60 so as to distribute tension on the clutch bands 60 over the entire width of the wider end portions 62 of the clutch bands 60.

Preferably, each anchor member 70 is in the form of an elongated cylindrical pin 72 suitably connected to the wider end portion 62 of one of the clutch bands 60 and to the anchor supporting flange members 26 and 30.

As is shown in FIGS. 1—3, each pin 72 may have a longitudinal slot 74 through the axis thereof with the wider end portion 62 of one of the clutch bands 60 passing through the slot 74 and being brazed or otherwise integrally bonded to the pin 72. The pin 72 may be hollow, as shown, to permit additional brazing or the like at the inner edges of the slot 74. In the alternative, as is shown in FIG. 4, each pin 72 may be journaled to one of the clutch bands 60, adjacent the wider end portion 62 of the clutch band 60, which end portion 76 has been wrapped around the pin 72 and brazed or otherwise integrally bonded at 76 to an intermediate portion 78 of the clutch band 60. The former alternative eliminates play between the wide end 62 of the clutch band 60 and the anchor supporting structure 24, reinforces the wide end 62 of the clutch band 60, and eliminates tight curves in the material of the clutch band 60. The latter alternative provides a more economical assembly.

Whether the assembly of the pins 72 of the clutch bands 60 is effected as in FIG. 3 or FIG. 4, or in some equivalent way, the pins 72 are journaled at their opposite ends 80 and 82, respectively, to the anchor supporting structure 24 of the drive clutch member 12 in suitably located circular openings 84 in the inner anchor supporting flange member 26 and in similar aligned openings 86 in the outer anchor supporting flange member 30.

The anchor supporting structure 24 may be temporarily disassembled, by removal of the outer split retaining ring 38 together with the outer anchor supporting flange member 30, to permit installation or replacement of the clutch bands 60, as will be understood.

In operation of the clutch 10 as hereinbefore described, during engagement or disengagement of the side edges 66 and 68 of the clutch bands 60, pivotal movement of the wider end portions 62 of the clutch bands 60 on the axes of the pins 72 eliminates flexure of the clutch bands 60. Furthermore, during engagement of the side edges 66 and 68 of the clutch bands 60, tension on the clutch bands 60 is distributed over the entire width of the wider end portions 62 thereof.

It should be understood that pins having knife edges on which the clutch bands may pivot may be used in place of cylindrical pins. However, cylindrical pins have better wear characteristics and for that reason are preferred.

Using the foregoing principles it is possible to construct a highly efficient overrunning band clutch having a single clutch band. In FIGS. 5 and 6, such a band clutch is indicated generally at 10'. In FIGS. 5—8, primed reference numerals are used to indicate elements which are similar in structure and function to like-numbered elements of FIG. 1—4.

In the clutch 10', the drive clutch member 12' is in the form of a drive shaft 18' adapted to be driven by a suitable prime mover (not shown), and the driven clutch member 14' is made fast to a drive shaft 20'. The drive clutch member 12' has an annular flange 22' at the outer end thereof. The driven clutch member 14' is arranged coaxially within the annular flange 22' in piloting relation to the drive clutch member 12'. Thus, in the arrangement of the parts as shown, when the driven clutch member 14' is rotating in the same direction as the drive clutch member 12' but at a faster speed, the driven clutch member 14' overruns the drive clutch member 12'.

The drive clutch member 12' comprises an anchor supporting structure, indicated generally at 24', disposed within the annular flange 22' and around the driven clutch member 14' and keyed to the annular flange 22'. The anchor supporting structure 24' comprises an inner anchor supporting flange member 26', on the inside of the driven clutch member 14', closely fitting the annular flange 26' and having an enlarged circular axial opening 28' through which portions of the driven clutch member 14' extend for free rotation with respect thereto, an outer anchor supporting flange member 30', similar to the inner anchor supporting flange member 26', on the outside of the driven clutch member 14', closely fitting the annular flange 22' and having an enlarged circular axial opening 32' through which portions of the driven clutch member 14' extend for free rotation with respect thereto, an elongated key 34', generally square in cross section, keying the flange 22' for conjoint rotation therewith, and opposed inner and outer split retaining rings 36' and 38', respectively, retaining the key 34' in place with respect to the annular flange 22'. The key 34' fits within a transverse keyway 40' in the annular flange 22' and within keyways 42' and 44' in the respective flange members 26' and 30'. The inner split retaining ring 36' is flush with the flange member 26', as shown in FIG. 5, and fits within a peripheral slot 46 in the annular flange 22' and within a cross slot 48' in the key 34'. The outer split retaining ring 38 similarly is flush with the flange member 30', as shown in FIG. 5, and fits within a peripheral slot 50' in the annular flange 22' and within a cross slot 52' in the key 34'.

The driven clutch member 14 is formed with a circumferentially extending V-groove 54' defined by opposed sidewalls 56' and 58' tapering inwardly toward each other and by a bottom wall 59'.

The clutch means 16' of the clutch 10' comprises a single clutch band 100 of generally spiral configuration, preferably made of spring steel stock.

As is best shown in FIG. 3, the clutch band 100 has a wider end portion 102 and a narrower end portion or tip 104 and is tapered therebetween. The clutch band 100, which is longer than a clutch band for a clutch having plural overlapping bands, is directed into the V-groove 54' with its side edges 106 and 108, respectively, engaging the side edges 56' and 58' of the V-groove 54'. The clutch band 100 extends more than 360° with respect to the V-groove 54' with the narrower end portion or tip 104 underlapping an intermediate portion 112 of the clutch band 100 at 110.

The clutch band 100 is anchored to the anchor supporting structure 24 by means of an elongated cylindrical pin 72' suitably connected to the wider end portion 102 of the clutch band 100 and to the anchor supporting structure 24' of the drive clutch member 12'. As shown, the wider end portion 102 of the clutch band 100 passes through a longitudinal slot 114 in the pin 72' through the axis thereof and is brazed or otherwise integrally bonded to the pin 72', as will be understood. The wider end portion 102 of the clutch band 100 extends for a limited distance through the slot 114 in the pin 100 to form a tab 116. An opening 118 of small diameter is provided in the tab 116.

The pin 72' is journaled at its opposite ends 80' and 82' in suitably located aligned circular openings 84' and 86' in the respective anchor supporting flange members 26' and 28' as will be understood.

A tab 120 is formed, by piercing or some other conventional method, on the clutch band 100, in the illustrated position, spaced between the underlapped intermediate portion 112 and the underlapping end portion 104. An opening 122 of small diameter is formed in the tab 120.

The intermediate portion 112 is reduced in width, as shown, such that it is free from frictional driving engagement with the side walls 56' and 58' of the V-groove 54' even when the clutch band 100 is tightly drawn into the V-groove 54'. As a result, the overlapping intermediate portion 112 tends to be pulled straight across the V-groove 54' thereby to force the underlapping end portion 104 radially into the V-groove 54'.

A tension spring 124, preferably of helical form, has a first end 126 anchored with respect to the drive clutch member 12 and a second end 128 anchored to the clutch band 100 between the underlapped intermediate portion 112 and the underlapping end portion 104. As shown, the first end 126 of the tension spring 124 is hooked into the opening 118 in the tab 116 at the wide end 102 of the clutch band 100. Because the tab 116 is adjacent the anchoring pin 72', in effect, the first end 126 of the tension spring 124 thereby is anchored with respect to the drive clutch member 12. As shown, the second end 128 of the tension spring 124 is hooked into the opening 122 in the tab 120 on the clutch band 100 between the underlapped intermediate portion 112 and the underlapping end portion 104. The tension spring 124 serves to counteract backlashing of the clutch band 100 upon disengagement of the side edges 106 and 108 thereof and prevents the underlapping end portion 104 from springing out from beneath the underlapped intermediate portion 112.

The tension spring 124 also tends to thrust the narrower end portion 104 of the clutch band 100 between the intermediate portion 112 and the V-groove 54'. As a result, frictional driving engagement of the side edges 106 and 108 of the clutch band 100 with the sidewalls 56' and 58' of the V-groove 54' may be effected by rotation of the drive clutch member 12' with respect to the driven clutch member 14', as will be understood. However, the driven clutch member 14' is permitted to overrun the drive clutch member 12' as in conventional band-type clutches.

While two preferred embodiments of the present invention and certain modifications thereof have been shown and described, it will be understood that various other modifications and rearrangements may be made without departing from the spirit and scope of the invention.

I claim:

1. In an overrunning band clutch having a drive clutch member and a driven clutch member coaxial with the drive clutch member, one of the clutch members having a circumferentially extending V-groove therein, the combination comprising spiral clutch band means wider at one end portion thereof than at the other end portion thereof, and anchoring means for pivotally anchoring said clutch band means at said wider end portion to the other of the clutch members with said other end portion extending into the V-groove of said one clutch member, said anchor means providing for pivotal movement of said wider end portion of said clutch band means during engagement and disengagement of the side edges of said other end portion of said clutch band means with the sidewalls of the V-groove of said one clutch member, said anchoring means being connected to said clutch band means at said wider end portion so as to distribute tension on said clutch band means over the entire width of said wider end portion during engagement of the side edges of said other end portion of said clutch band means with the sidewalls of the V-groove of said one clutch member, wherein said anchor means comprises an anchor member connected to said wider end portion of said clutch band means and to said other clutch member so as to permit pivotal movement of said wider end portion of said clutch band means on an axis transverse to said wider end portion of said clutch band means and parallel to the axis common to the clutch members during engagement and disengagement of the side edges of said other end portion of said clutch band means with the sidewalls of the V-groove of said one clutch member, and wherein said anchor member is in the form of an elongated cylindrical pin having a longitudinal slot therethrough, said pin being journaled at its opposite ends to said other clutch member, said wider end portion of said clutch band means passing through the slot in said pin and being integrally bonded to said pin.

2. The combination of claim 1 wherein said wider end portion of said clutch band is brazed to said pin.

3. The combination of claim 1 wherein said pin is hollow.

4. In an overrunning band clutch having a drive clutch member and a driven clutch member, one of the clutch members having a circumferentially extending V-groove therein, the combination comprising spiral clutch band means wider at one end portion thereof than at the other end portion thereof, and anchoring means for pivotally anchoring said clutch band means at said wider end portion to the other of said clutch members with said other end portion extending into the V-groove of said one clutch member, said anchor means providing for pivotal movement of said wider end portion of said clutch band means during engagement and disengagement of the side edges of said other end portion of said clutch band means with the sidewalls of the V-groove of said one clutch member, said anchoring means being connected to said clutch band means at said wider end portion so as to distribute tension on said clutch band means over the entire width of said wider end portion during engagement of the side edges of said other end portion of said clutch band means with the sidewalls of the V-groove of said one clutch member, wherein said anchor means comprises an anchor member connected to said wider end portion of said clutch band means and to said other clutch members so as to permit pivotal movement of said wider end portion of said clutch band means on an axis transverse to said wider end portion of said clutch band means and parallel to the axis common to the clutch members during engagement and disengagement of the side edges of said other end portion of said clutch band means with the sidewalls of the V-groove of said one clutch member, and wherein said anchor member is in the form of an elongated cylindrical pin having a longitudinal slot therethrough, said pin being journaled at its opposite ends to said other clutch member, said wider end portion of said clutch band means passing through the slot in said pin and being anchored to said pin for uniformly applying stress to the band.

5. In an overrunning band clutch having a drive clutch member and a driven clutch member coaxial with the drive clutch member, one of the clutch members having a circumferentially extending V-groove therein, the combination comprising spiral clutch band means wider at one end portion thereof than at the other end portion thereof, and anchoring means for pivotally anchoring said clutch band means at said wider end portion to the other of said clutch members with said other end portion extending into the V-groove of said one clutch member, said anchor means providing for pivotal movement of said wider end portion of said clutch band means during engagement and disengagement of the side edges of said other end portion of said clutch band means with the sidewalls of the V-groove of said one clutch member, said anchoring means being connected to said clutch band means at said wider end portion so as to distribute tension on said clutch band means over the entire width of said wider end portion during engagement of the side edges of said other end portion of said clutch band means with the sidewalls of the V-groove of said one clutch member, and wherein said clutch band means comprises a single clutch band extending more than 360° with respect to the V-groove of said one clutch member with said other end portion of said clutch band underlapping an intermediate portion of said clutch band, and means for forcing said underlapping end portion radially into the V-groove of said one clutch member.

6. The combination of claim 5 wherein said last named means is formed by a reduced width portion of said clutch band along said underlapped intermediate portion to force said underlapping end portion radially into the V-groove of said one clutch member.

7. In an overrunning band clutch having a drive clutch member and a driven clutch member coaxial with the drive clutch member, one of the clutch members having a circumferentially extending V-groove therein, the combination comprising spiral clutch band means wider at one end portion thereof than at the other end portion thereof, and anchoring means for pivotally anchoring said clutch band means at said wider end portion to the other of the clutch members with said other end portion extending into the V-groove of said one clutch member, said anchor means providing for pivotal movement of said wider end portion of said clutch band means during engagement and disengagement of the side edges of said other end portion of said clutch band means with the sidewalls of the V-groove of said one clutch member, said anchoring means being connected to said clutch band means at said wider end portion so as to distribute tension on said clutch band means over the entire width of said wider end portion during engagement of the side edges of said other end portion of said clutch band means with the sidewalls of the V-groove of said one clutch member, wherein said clutch band means comprises a single clutch band extending more than 360° with respect to the V-groove of said one clutch member with said other end portion of said clutch band underlapping an intermediate portion of said clutch band, a tension spring having a first end anchored with respect to said other clutch member and a second end anchored to said clutch band between said underlapped intermediate portion and said underlapping end portion to counteract backlashing of said clutch band upon disengagement of the side edges of said other end portion of said clutch band.

UNITED STATES PATENT OFFICE
CERTIFICATE OF CORRECTION

Patent No. 3,550,736          Dated December 29, 1970

Inventor(s) Ernest U. Lang

It is certified that error appears in the above-identified patent and that said Letters Patent are hereby corrected as shown below:

Column 6, line 35, "member," should read -- member coaxi with the drive clutch member, --.

Signed and sealed this 11th day of May 1971.

(SEAL)
Attest:

EDWARD M. FLETCHER, JR.
Attesting Officer

WILLIAM E. SCHUYLER,
Commissioner of Pater